United States Patent

[11] 3,587,943

[72] Inventor Leonardus Marinus Van Hulsel
Flat 1, Maple Flats, Worksop Road,
Masterton, New Zealand
[21] Appl. No. 755,216
[22] Filed Aug. 26, 1968
[45] Patented June 28, 1971
[32] Priority Sept. 6, 1967
[33] New Zealand
[31] 149,987

[54] BOTTLE OR LIKE POURERS
5 Claims, 3 Drawing Figs.
[52] U.S. Cl. ............................................. 222/455,
222/481
[51] Int. Cl. .............................................. G01f 11/26
[50] Field of Search ........................................... 222/456,
457, 547, 567, 564, 478, 481, 479, 454, 455

[56] References Cited
UNITED STATES PATENTS
1,924,809  8/1933  Schuelke et al. ............. 222/478X

| 2,428,233 | 9/1947 | Livadas ...................... | 222/455 |
| 3,081,008 | 3/1963 | Hester ........................ | 222/478X |
| 3,148,801 | 9/1964 | Radeloff et al. ............. | 222/481X |

Primary Examiner—Samuel F. Coleman
Assistant Examiner—Norman L. Stack, Jr.
Attorney—Young & Thompson ABSTRACT: A measuring pourer for a bottle or the like comprising a generally cylindrical body having a lower portion adapted for fitting into or onto an open end of the bottle or the like, an inner compartment provided in and concentrically arranged with the said body, tubes extending from inside the inner compartment and through the lower portion of the body for extending into the bottle, two pourer openings located diametrically opposite one another at the upper end of the body and partitions extending down between the body and the inner compartment to equally separate the pourer openings from a lower open end of the inner compartment.

PATENTED JUN28 1971

3,587,943

INVENTOR

LEONARDUS MARINUS VAN HULSEL

BY Young & Thompson
ATTYS.

BOTTLE OR LIKE POURERS

This invention relates to improvements in pouring devices incorporated in or for attachment to the tops of bottles or like to allow a measured quantity of liquid from the bottle to be dispensed.

These devices take on many forms but essentially include a liquid-measuring chamber which is charged when the bottle is inverted and emptied when the bottle is reverted to its normal position.

The object of the present invention is to provide an improved measuring pourer for a bottle or the like, the pourer having such a construction that not only a predetermined and accurate amount of liquid from the bottle, when the pourer is mounted over the bottle mouth, will be charged into the pourer on inversion of the bottle, but on further movement of the bottle the predetermined and accurate amount of liquid can flow from one of two pourer outlets very quickly and accurately.

Figure 1:
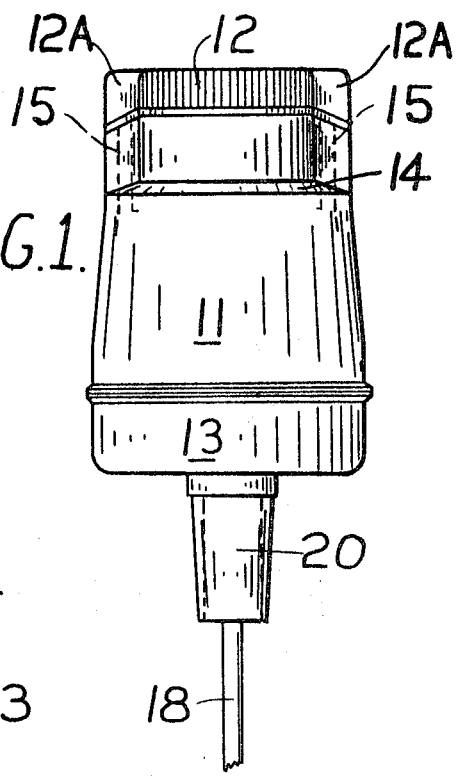
Figure 2:
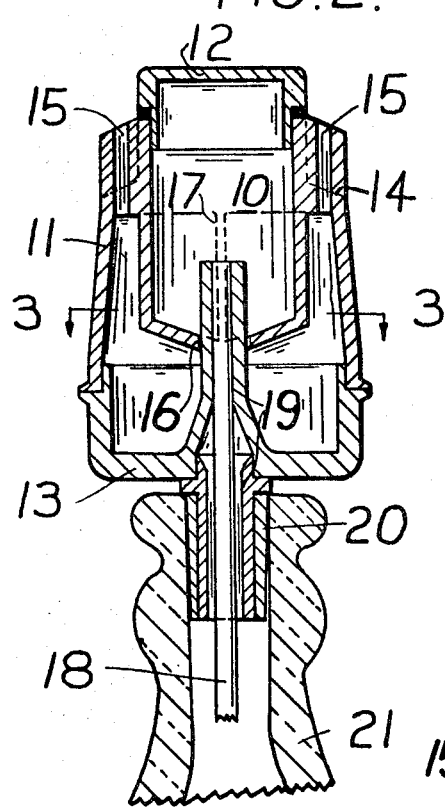
Figure 3:
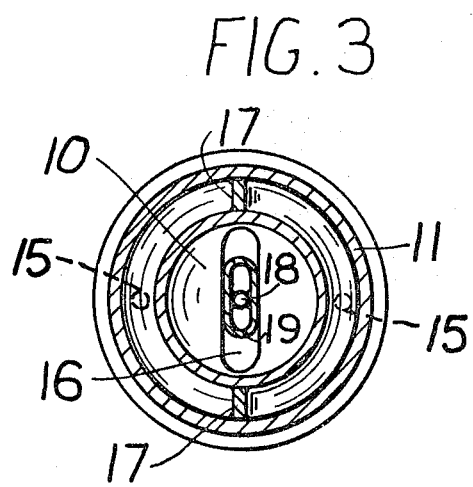

In further describing the invention, reference will be made hereinafter to the accompanying drawing, in which:

FIG. 1 is an external elevation of the pourer with its tubes shown broken in their length, FIG. 2 is a cross section through a main part of the device and an upper part of a bottle, and FIG. 3 is a cross section taken on the line 3-3 in FIG. 2.

In giving effect to the invention, as a preferred embodiment, the shape of the device can be varied to suit various bottles but the internal compartment 10 of its main body 11 has a predetermined volumetric capacity to provide for a correct measured quantity of the contents of a bottle to be dispensed.

The body 11 of the device is generally cylindrical in cross section and includes upper and lower caps 12 and 13 the former being a push fit into the top end of the body part and the latter is a sliding fit and can be secured by a soft rubberband (not shown) over the compositely formed ridge between parts, completing the body. The body gradually reduces in diameter towards its upper end providing a ribbed peripheral shoulder 14 through which are located the two pourer spouts or openings 15. The openings 15 are located in the peripheral shoulder 14 diametrically opposite one another and extending in parallel with the centerline or axis of the device, but at 90° to a flat inner shoulder of the body part.

The wall of the inner compartment 10 is concentric generally with the wall of the body 11 and extends from the top cap 12 down to the lower open end 16, which is of an elongate shape in cross section. The sidewalls or partitions 17 are located diametrically opposite one another and on a located position at right angles to a line passing through the pourer openings. The partitions extend the length of the compartment wall to provide concentric part walls of the compartment and the body channels (see FIG. 3) directed towards the pourer openings 15, each channel to hold a full measure of the liquid when the pourer is operated.

The two tubes 18 and 19 are arranged one within the other. The inner tubes 18 extends down for about 6 inches from its upper end inside the inner compartment 10. The outer tube 19 extends down to be located inside the neck of the bottle for about an inch. A cork or other plug 20 is fitted onto the lower extension of the tube, 19. Preferably the tube 19 is provided by two parts one part formed integral with the lower body 13 to extend upwardly therefrom and the other tube part being a piece fitted into a hole in the body part 13. The other tube 18 is a separate one pushed into the tube 19.

The upper end of the two tubes 18, 19 end at the same level within the compartment 10. The outer tube 19 has two external flats extending down from its upper end to a point to be level with the width of the lower elongate open end 16 of the compartments 19. Thus the outer tube 19 can only be inserted by this flattened part passing into the elongate open end 16.

In use with this improved pourer fitted to the appropriate liquid-charged bottle 21 by means of its cork 20, by inverting the bottle, the inner compartment 10 fills with liquid from the bottle through the two concentric air inlets of tube 19 until 18 is blocked. The air coming in through the external openings 15 makes this liquid flow possible. This gives a correct measure because the liquid level pivots around the air inlet and the area on both sides is the same capacity.

Upon reverting the bottle 21 back to its normal upright position, the liquid runs from the inner compartment 10 through its lower open end 16 and into the bottom of the body 11 of the pourer. Further tipping of the device allows this measured quantity of the liquid to be held in the channel below one of the pourer openings 15, depending which way the device is tipped, and the liquid in the channel is then poured normally through the respective opening 15 into a separate receptacle such as a tumbler (not shown), and in so doing, the other and opposite opening 15 by not being used, allows air to pass into the bottle 21 through the one tube, thus making it possible for the liquid in the bottle to release a further measured quantity of the liquid into the compartment 10, which flow again ceases as soon as the inlet tube is closed. In this case a further measured quantity is allowed into compartment 10 whilst the first measured quantity is being poured into the tumbler.

The diametrically opposite pourer openings 15 will allow for either left-hand or right-hand pouring and the partitions 17 separating the external openings 15 are required so that the pourer can be used at a desired angle and not simply at 45° angle. These partitions prevent the liquid from gushing around from one opening 15 to the other end stopping the liquid from being poured by cutting off air inlet. Any one side of the pourer will hold the same quantity as the volumetric capacity of the compartment.

The combined supply inlet 19 from the bottle are slightly bigger than that of the openings 15 to ensure that the compartment 10 is filled before the already measured quantity has been released into the tumbler.

Preferably the top cap 12 is formed with two ears 12A so that when the cap is rotated by hand the openings 15 will be covered by the ears.

I claim:

1. A measuring pourer for a bottle or the like, comprising a generally cylindrical hollow body having a lower portion adapted for releasable securement to an open end of the bottle or the like, means defining an inner compartment concentrically within said body, said inner compartment defining an outer chamber between said inner compartment and the body, said outer chamber surrounding a lower portion of said inner compartment and extending below said inner compartment, a pair of tubes extending from inside the inner compartment and through the lower portion of the body for extending into the bottle, the lower portion of said inner compartment opening into the lower portion of said outer chamber, two pourer openings located diametrically opposite one another at the upper end of said outer chamber, and partitions extending down between the body and the inner compartment at equal distances between said pourer openings to bisect the upper portion of said outer chamber.

2. A measuring pourer as claimed in claim 1, the axes of the pourer openings extending parallel to the axis of the cylindrical body.

3. A measuring pourer as claimed in claim 1, said tubes being disposed one within the other.

4. A measuring pourer as claimed in claim 3, the inner of said tubes being longer than the outer of said tubes to extend a greater distance into the bottle, said outer tube having a flattened upper end within said inner compartment.

5. A measuring pourer as claimed in claim 4, said lower portion of said inner compartment opening into the lower portion of said outer chamber through openings that are disposed at opposite ends of and in line with said flattened upper end of said outer tube.